(12) United States Patent
Maekawa

(10) Patent No.: US 11,998,496 B2
(45) Date of Patent: Jun. 4, 2024

(54) POWER TRANSMISSION MECHANISM

(71) Applicant: NATIONAL INSTITUTE OF ADVANCED INDUSTRIAL SCIENCE AND TECHNOLOGY, Tokyo (JP)

(72) Inventor: Hitoshi Maekawa, Tokyo (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 49 days.

(21) Appl. No.: 17/613,382

(22) PCT Filed: Dec. 1, 2020

(86) PCT No.: PCT/JP2020/044720
§ 371 (c)(1),
(2) Date: Nov. 22, 2021

(87) PCT Pub. No.: WO2021/176781
PCT Pub. Date: Sep. 10, 2021

(65) Prior Publication Data
US 2023/0301850 A1   Sep. 28, 2023

(30) Foreign Application Priority Data
Mar. 6, 2020 (JP) ................. 2020-038391

(51) Int. Cl.
*A61G 5/10* (2006.01)
*F16H 1/36* (2006.01)
*F16H 1/46* (2006.01)

(52) U.S. Cl.
CPC ........... *A61G 5/1027* (2013.01); *A61G 5/101* (2013.01); *A61G 5/1037* (2013.01); *F16H 1/36* (2013.01); *F16H 1/46* (2013.01)

(58) Field of Classification Search
CPC ...... A61G 1/102; A61G 1/1027; A61G 5/101; A61G 5/1037; A61G 5/1035; F16H 1/36;
(Continued)

(56) References Cited

U.S. PATENT DOCUMENTS 4,045,047 A * 8/1977 Buckley ............... A61G 5/1027
                                                              188/82.2
5,362,081 A * 11/1994 Beidler ..................... F16H 3/54
                                                              280/238
(Continued)

FOREIGN PATENT DOCUMENTS

| CN | 108210184 A | 6/2018 |
| JP | 5105256 B2 | 12/2012 |
| WO | WO 2017/110840 A1 | 6/2017 |

OTHER PUBLICATIONS

International Search Report, PCT/ISA/220, dated Dec. 18, 2020, for PCT Application No. PCT/JP2020/044720.
(Continued)

*Primary Examiner* — Robert A. Siconolfi
*Assistant Examiner* — James K Hsiao
(74) *Attorney, Agent, or Firm* — STAAS & HALSEY LLP

(57) ABSTRACT

In a power transmission mechanism 20, a line connecting a center shaft 21 of a reference gear member 40 and a first shaft 44 of a first planetary gear member 42 and a line connecting the center shaft 21 of the reference gear member 40 and a second shaft 47 of a second planetary gear member 45 form a specific angle α. Rotation in one direction is prevented when a first carrier member 22 and a second carrier member 32 are relatively rotated in a direction to decrease the specific angle α. Further, a rotation prevention release unit is provided to release a prevention state of the rotation when the first carrier member 22 and the second (Continued)

carrier member 32 are relatively rotated in a direction to increase the specific angle α.

12 Claims, 15 Drawing Sheets

(58) Field of Classification Search
CPC . F16H 1/46; F16H 1/48; F16H 1/2836; F16H 1/2845; F16H 48/11; F16H 57/082; F16H 1/2872
See application file for complete search history.

(56) References Cited

U.S. PATENT DOCUMENTS

| | | | | |
|---|---|---|---|---|
| 5,482,305 A * | 1/1996 | Jeffries | ................ | A61G 5/1054 |
| | | | | 475/331 |
| 5,486,016 A * | 1/1996 | Godin | ...................... | A61G 5/02 |
| | | | | 280/238 |
| 5,743,544 A * | 4/1998 | Weaver | ................... | A61G 5/02 |
| | | | | 74/405 |
| 6,494,278 B1 * | 12/2002 | Weisz | ................. | A61G 5/1083 |
| | | | | 180/907 |
| 6,598,724 B1 * | 7/2003 | Stedman | ................ | A61G 5/101 |
| | | | | 192/217 |
| 6,755,430 B1 * | 6/2004 | Watwood | ............... | A61G 5/025 |
| | | | | 280/250.1 |
| 6,863,141 B2 * | 3/2005 | Weisz | .................. | A61G 5/1027 |
| | | | | 74/354 |
| 9,046,154 B2 * | 6/2015 | Ishizuka | ............. | B60K 17/046 |
| 9,301,892 B2 * | 4/2016 | Daigle | ................ | A61G 5/1083 |
| 10,470,953 B1 * | 11/2019 | Green | ................. | A61G 5/1035 |
| 10,617,580 B2 * | 4/2020 | Steiner | ............... | A61G 5/1024 |
| 2004/0082420 A1 * | 4/2004 | Robinson | ............ | B60K 17/046 |
| | | | | 475/183 |
| 2008/0073869 A1 * | 3/2008 | Patterson | ............ | A61G 5/1008 |
| | | | | 280/244 |
| 2016/0075402 A1 * | 3/2016 | McNamara | ............... | F16H 1/36 |
| | | | | 301/6.5 |
| 2017/0370445 A1 * | 12/2017 | Okumura | .............. | B60K 17/046 |
| 2019/0085941 A1 * | 3/2019 | Klassen | ................ | F16H 57/08 |

OTHER PUBLICATIONS

Written Opinion, PCT/ISA/237, dated Dec. 18, 20201, for PCT Application No. PCT/JP2020/044720.

* cited by examiner

POWER TRANSMISSION MECHANISM

CROSS-REFERENCE TO RELATED APPLICATIONS

This application is a U.S. National Stage under 35 USC 371 of International Application PCT/JP2020/044720 filed Dec. 1, 2020, and claims priority to Japanese application 2020-038391 filed Mar. 6, 2020, which are incorporated herein by reference in their entireties.

FIELD

The present invention relates to a power transmission mechanism which is applied to, for example, a wheelchair and transmits a rotational force.

BACKGROUND

Conventionally, when a user uses a wheelchair, if the user tries to sit in a state where the user forgets to apply a brake, accidents in which the user falls down with his/her legs being into contact with the wheelchair causing the wheelchair to move backward frequently occur. Further, when the user releases his/her hand from a hand rim during slope-climbing, there is a problem that the wheelchair moves backward (moves in a direction opposite to a travel direction).

In order to solve such a problem, there is a technique described in Patent Document 1. This technique is configured such that the wheelchair does not move backward even if the legs of a user come in contact with the wheelchair when the user tries to sit on the wheelchair and the wheelchair is braked and does not move backward even if the user releases his/her hand from the hand rim during slope-climbing. Hereinafter, such a brake function is referred to as a reverse brake.

LIST OF DOCUMENTS

Patent Documents

Patent Document 1: Japanese Patent No. 5105256

SUMMARY

Technical Problem

The technique disclosed in Patent Document 1 described above is configured to be capable of preventing falling-down at the time of sitting-down and reverse moving during slope-climbing without disturbing intentional reverse moving by the user. Specifically, the technique of Patent Document 1 is configured such that braking is not applied when the user normally or reversely rotates a hand rim to move forward or backward or when an external force acts in the forward direction.

However, when a caregiver wants to move the wheelchair backward, for example, when the caregiver moves the wheelchair backward in both a state in which the hand rim is not operated while the user is seated and a state in which the user is not seated, there is a problem that the reverse brake is applied to restrict the operation of the caregiver.

The present invention has been made in view of the above problem, and an object thereof is to provide a power transmission mechanism having the reverse brake and being capable of temporarily releasing the reverse brake.

Solution to Problem

To achieve abovementioned objects, an invention according to claim 1 provides a power transmission mechanism including a reference gear member arranged on a center shaft, a first carrier member arranged rotatably about the center shaft of the reference gear member, a second carrier member arranged rotatably about the center shaft of the reference gear member, a first planetary gear member rotatably arranged to the first carrier member via a first shaft and meshed with the reference gear member, and a second planetary gear member rotatably arranged to the second carrier member via a second shaft and meshed with the first planetary gear member. Here, the second carrier member is configured to be relatively rotatable with respect to the first carrier member in a predetermined range. The first carrier member and the second carrier member are arranged concentrically about the reference gear member. The reference gear member, the first planetary gear member, and the second planetary gear member are arranged such that a line connecting the center shaft of the reference gear member and the first shaft of the first planetary gear member and a line connecting the center shaft of the reference gear member and the second shaft of the second planetary gear member form a specific angle. Rotation in one direction is prevented when the first carrier member and the second carrier member are relatively rotated in a direction to decrease the specific angle. Further, a rotation prevention release means is provided to release a prevention state of the rotation when the first carrier member and the second carrier member are relatively rotated in a direction to increase the specific angle.

In addition to the configuration of claim 1, in the invention of claim 2, the rotation prevention release means includes a moving member movable along an axial direction of the center shaft of the reference gear member, and a cam member fixed to the moving member, and is configured to release the prevention state of the rotation by moving the cam member in a direction to be close to the first carrier member and the second carrier member so that the first carrier member and the second carrier member are relatively rotated in the direction to increase the specific angle.

In addition to the configuration of claim 1 or 2, in the invention of claim 3, the first shaft of the first planetary gear member is inserted to a first shaft insertion hole formed in the first carrier member and is loosely inserted to a first shaft insertion hole formed in the second carrier member, and the second carrier member is configured to be relatively rotatable in a predetermined range with respect to the first carrier member.

In addition to the configuration of any one of claims 1 to 3, in the invention of claim 4, a gap is provided between the first planetary gear member and the first shaft.

In addition to the configuration of any one of claims 1 to 4, in the invention of claim 5, the center shaft is connected to a body frame of a wheelchair, the first carrier member is connected to a hand rim of the wheelchair, and the second carrier member is connected to a wheel of the wheelchair.

In addition to the configuration of claim 5, in the invention of claim 6, the rotation prevention release means includes a release lever, the release lever is attached to an operation handle for controlling a travel direction of the wheelchair, and the cam member is moved by operating the release lever to release the prevention state of the rotation.

Advantageous Effects

According to the invention of claim 1, the reference gear member, the first planetary gear member, and the second planetary gear member are arranged such that the line connecting the center shaft of the reference gear member and the first shaft of the first planetary gear member and the line connecting the center shaft of the reference gear member and the second shaft of the second planetary gear member form a specific angle. Rotation in one direction is prevented when the first carrier member and the second carrier member are relatively rotated in the direction to decrease the specific angle. Further, the rotation prevention release means is provided to release the prevention state of the rotation when the first carrier member and the second carrier member are relatively rotated in the direction to increase the specific angle. Accordingly, the reverse brake is provided and the reverse brake can be released temporarily.

According to the invention of claim 2, the prevention state of the rotation is released by moving the cam member in the direction to be close to the first carrier member and the second carrier member so that the first carrier member and the second carrier member are relatively rotated in the direction to increase the specific angle. Since the reverse brake is mechanically released, the reliability can be improved.

According to the invention of claim 3, the first shaft of the first planetary gear member is inserted to the first shaft insertion hole formed in the first carrier member and is loosely inserted to the first shaft insertion hole formed in the second carrier member, and the second carrier member is configured to be relatively rotatable in the predetermined range with respect to the first carrier member. Thus, the reverse brake can be operated without using other members.

According to the invention of claim 4, since the gap is provided between the first planetary gear member and the first shaft, the first planetary gear member is easily meshed between the reference gear member and the second planetary gear member, and the reverse brake can be easily operated.

According to the invention of claim 5, the center shaft is connected to the body frame of the wheelchair, the first carrier member is connected to the hand rim of the wheelchair, and the second carrier member is connected to the wheel of the wheelchair. Accordingly, the operability of the wheelchair can be greatly improved.

Further, according to the invention of claim 6, the rotation prevention release means includes the release lever, the release lever is attached to the operation handle for controlling the travel direction of the wheelchair, and the cam member is moved by operating the release lever to release the prevention state of the rotation. Accordingly, the release operation of the reverse brake becomes extremely easy, and the operability of the wheelchair can be greatly improved.

DETAILED DESCRIPTION

Hereinafter, embodiments of the present invention will be described in detail with reference to the drawings.

One Embodiment

Figure 1:
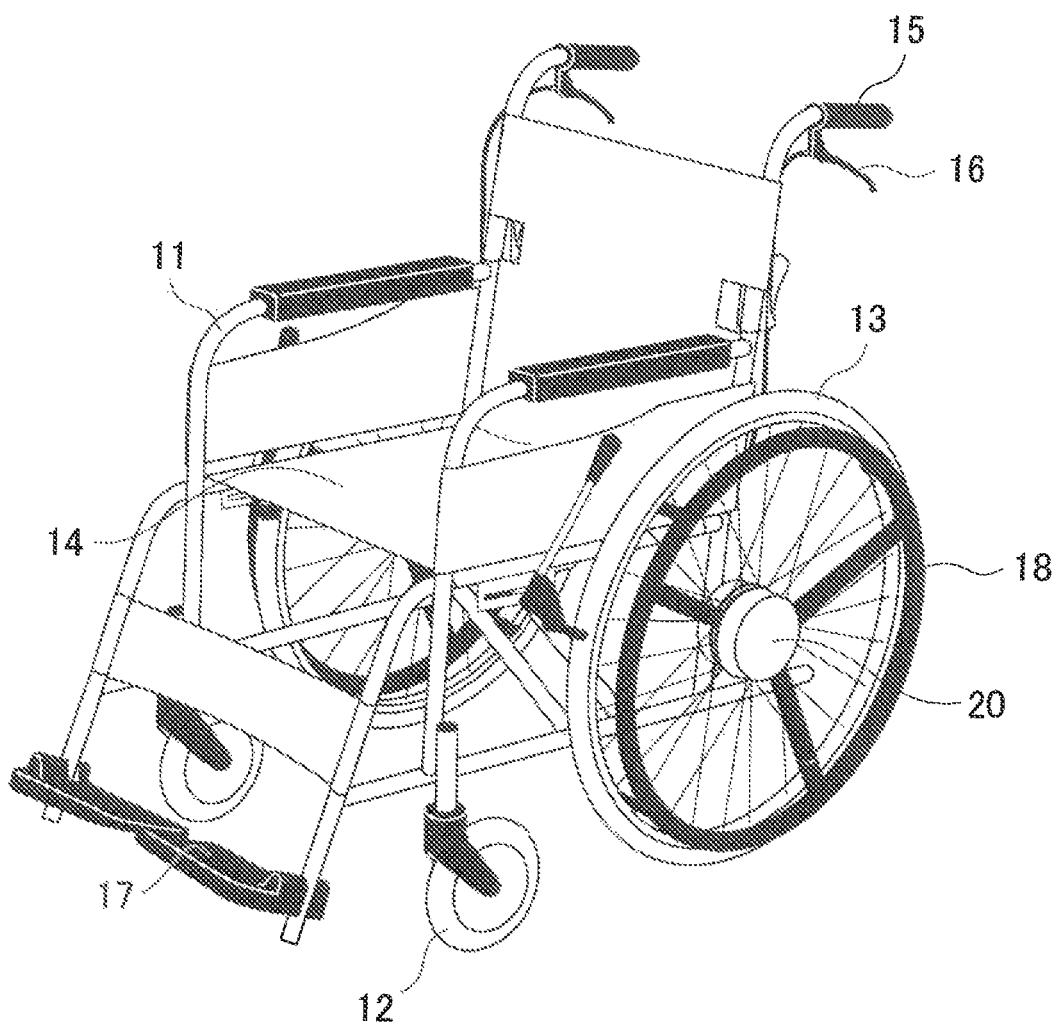
FIG. 1 is a schematic perspective view showing a wheelchair to which a power transmission mechanism according to an embodiment of the present invention is applied.
Figure 2:
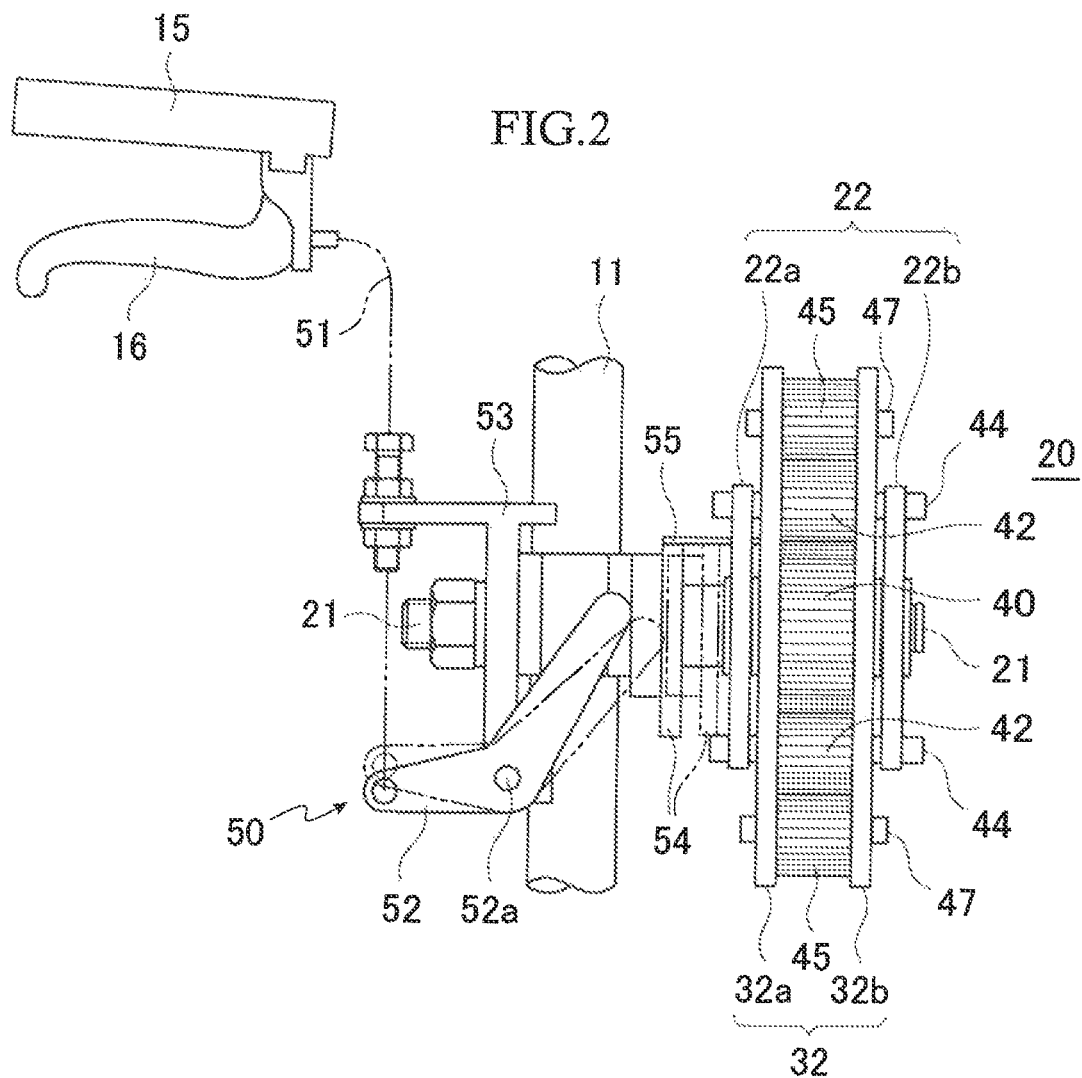
FIG. 2 is a front view, as viewed from the front of the wheelchair, of the power transmission mechanism attached to a wheel on the left hand side of a user as the power transmission mechanisms according to the embodiment of the present invention attached to the wheelchair of FIG. 1.
Figure 3:
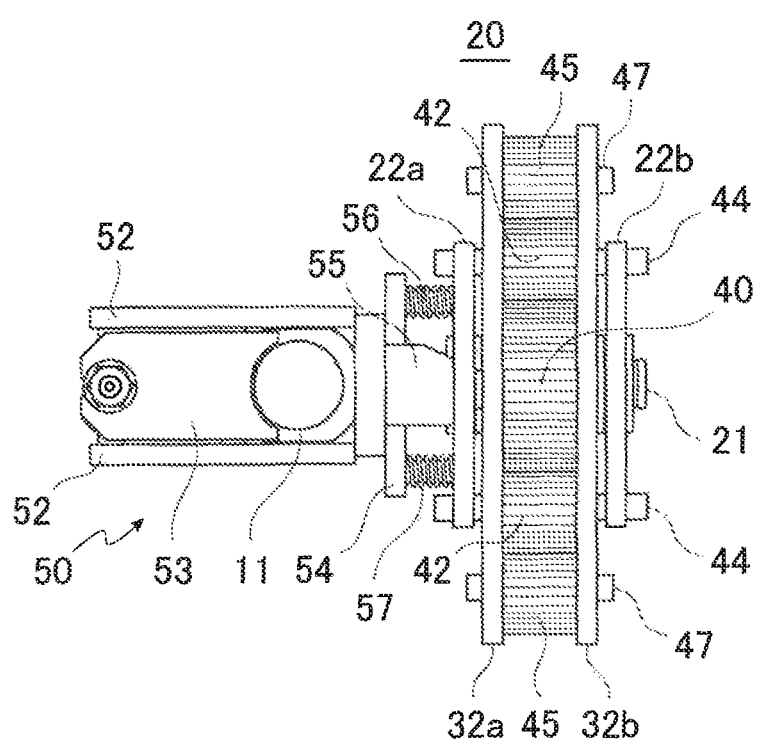
FIG. 3 is a plane view showing the power transmission mechanism of FIG. 2.
Figure 4:
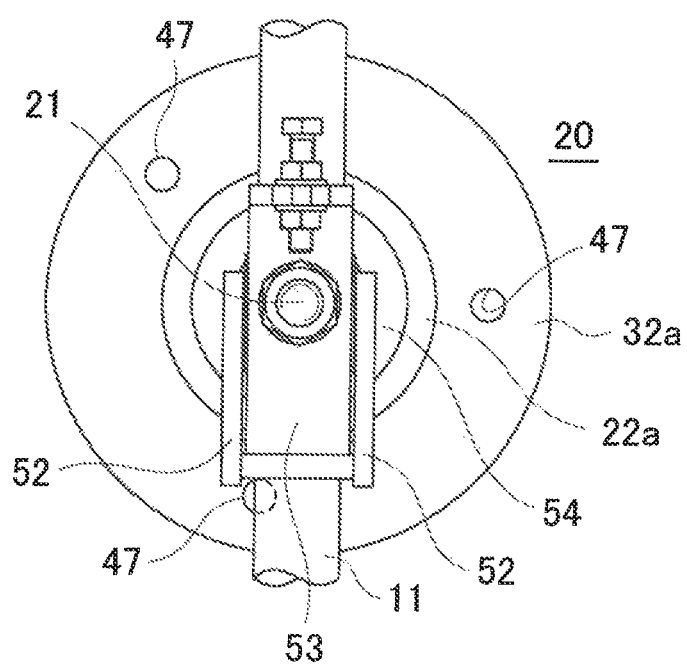
FIG. 4 is a left side view showing the power transmission mechanism of FIG. 2.
Figure 5:
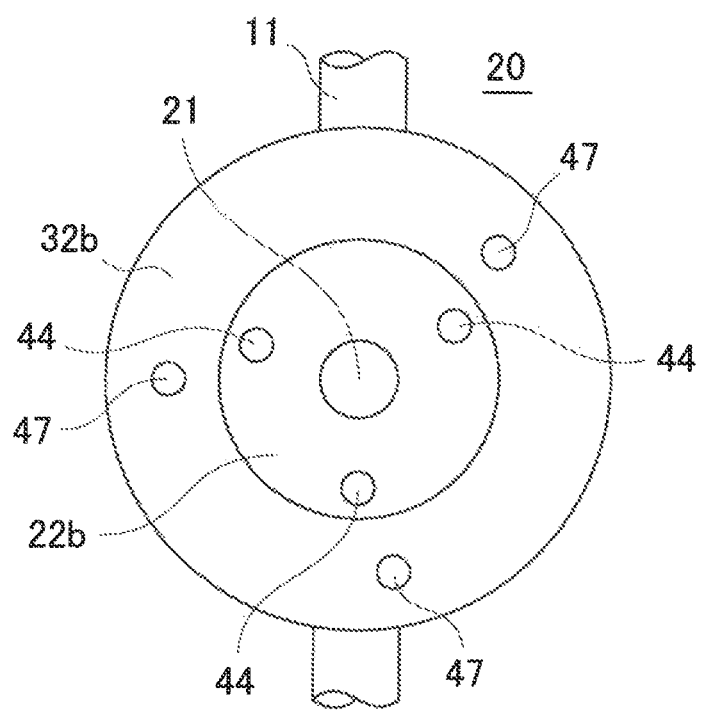
FIG. 5 is a right side view showing the power transmission mechanism of FIG. 2.

FIGS. 1 to 15 show one embodiment of the present invention. FIG. 1 is a schematic perspective view showing a wheelchair to which a power transmission mechanism according to an embodiment of the present invention is applied. FIG. 2 is a front view showing a power transmission mechanism according to the embodiment of the present invention. FIG. 3 is a plane view showing the power transmission mechanism of FIG. 2. FIG. 4 is a left side view showing the power transmission mechanism of FIG. 2. FIG. 5 is a right side view showing the power transmission mechanism of FIG. 2. In FIG. 2, illustration of a guide pin and a coil spring, which will be described later, is omitted.

As shown in FIG. 1, a wheelchair 10 includes a pipe-frame-shaped body frame 11. The front and rear portions of the body frame 11 are supported in a movable manner respectively by a pair of left and right casters 12 and a pair of left and right wheels 13. A seat 14 on which a user is seated is installed at the center of the body frame 11.

The body frame 11 is provided with a pair of left and right operation handles 15 which extend upward from both sides of a rear portion thereof, have upper end portions bent backward, and are to be operated by a caregiver. A release lever 16 for releasing the reverse brake by being operated by the caregiver is attached to each of the operation handles 15. A step 17 on which a user places his/her foot is attached to a lower portion of a front end of the body frame 11.

The pair of left and right wheels 13 are rotatably supported by an axle (not shown). A hand rim 18 to be operated by a user is provided on the outer side of each wheel 13, and each wheel 13 can be moved forward or backward by operating the hand rim 18 forward or backward.

A power transmission mechanism 20 is attached to each wheel 13 of the wheelchair 10 shown in FIG. 1. Regarding each of the power transmission mechanisms 20, as shown in FIGS. 2 to 5, a first carrier member 22 and a second carrier member 32 are arranged rotatably about a center shaft 21 fixed to the body frame 11. The first carrier member 22 is formed in a smaller diameter than the second carrier member 32.

The first carrier member 22 has an inner first carrier member 22a arranged on the inner side and an outer first carrier member 22b arranged on the outer side. Similarly, the second carrier member 32 has an inner second carrier member 32a arranged on the inner side and an outer second carrier member 32b arranged on the outer side.

In the following description, the inner first carrier member 22a and the outer first carrier member 22b are collectively referred to as the first carrier member 22, and the inner second carrier member 32a and the outer second carrier member 32b are collectively referred to as the second carrier member 32.

The first carrier member 22 is connected to the hand rim 18 of the wheelchair 10 via a connecting member (not shown) and the second carrier member 32 is connected to the wheel 13 of the wheelchair 10 also via a connecting member (not shown).

Figure 6:
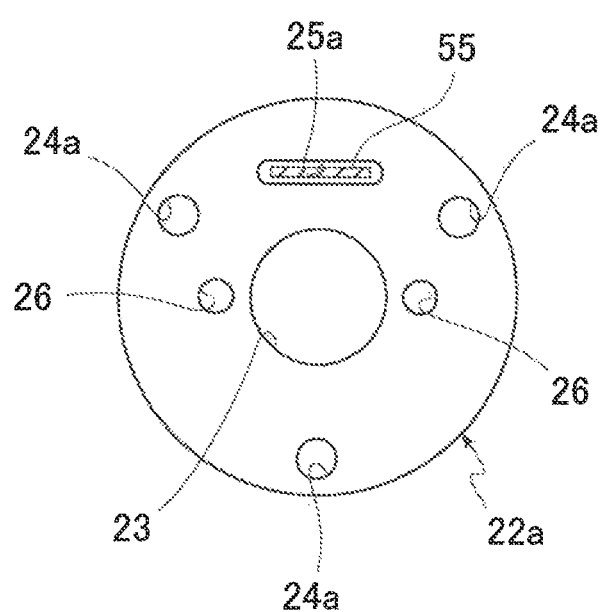
FIG. 6 is a side view showing an inner first carrier member of the power transmission mechanism of FIG. 2.
Figure 7:
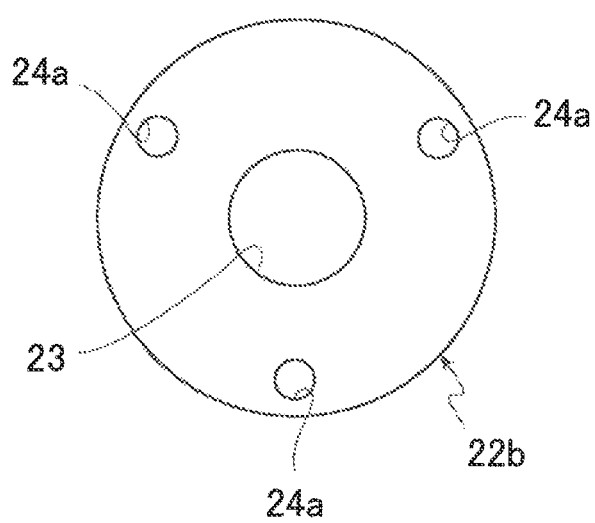
FIG. 7 is a side view showing an outer first carrier member of the power transmission mechanism of FIG. 2.
Figure 8:
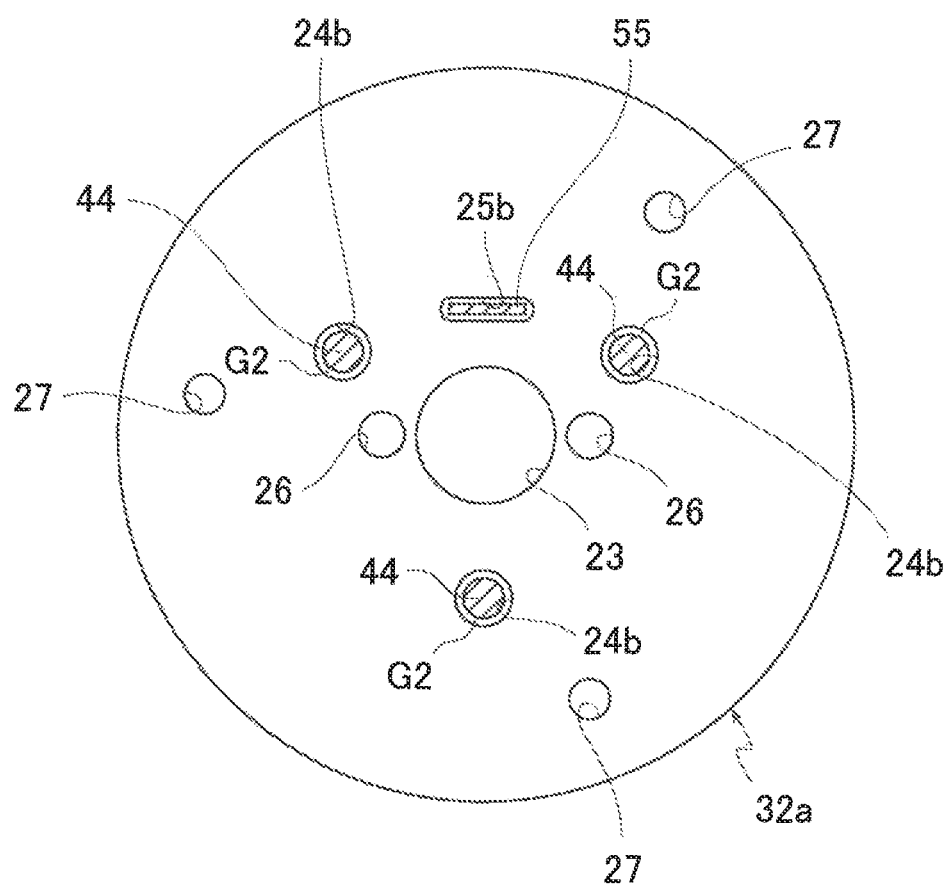
FIG. 8 is a side view showing an inner second carrier member of the power transmission mechanism of FIG. 2.
Figure 9:
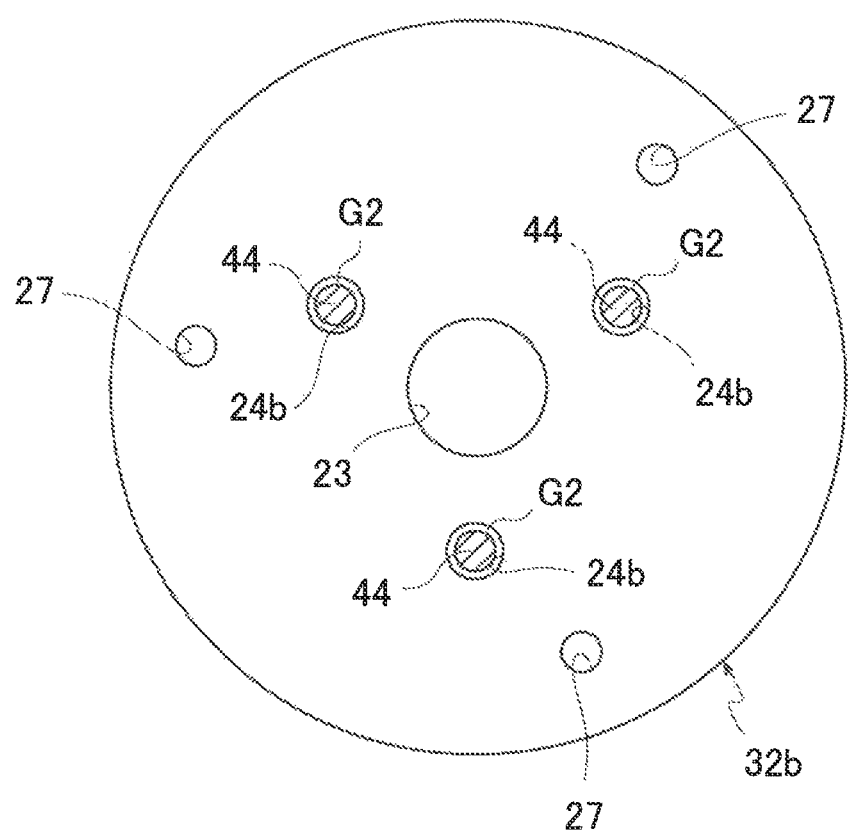
FIG. 9 is a side view showing an outer second carrier member of the power transmission mechanism of FIG. 2.
Figure 10:
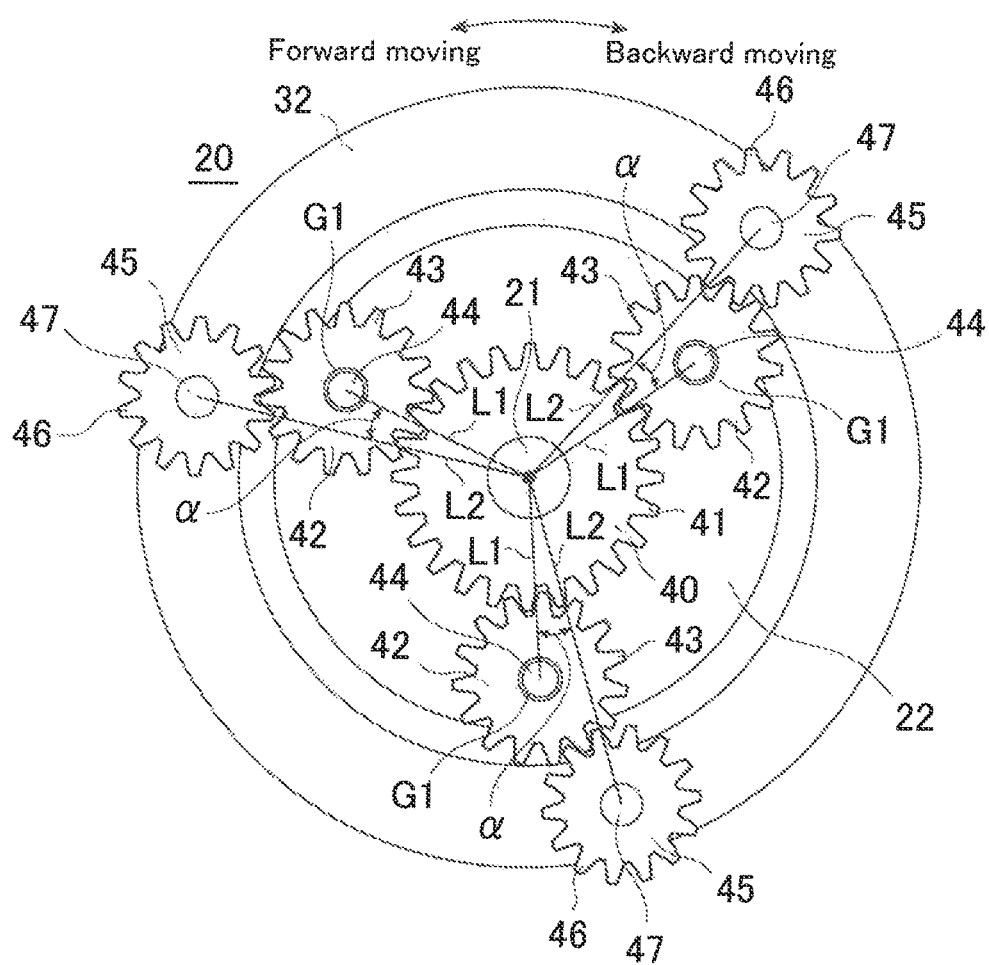
FIG. 10 is a conceptual diagram showing the power transmission mechanism according to an embodiment of the present invention.
Figure 11:
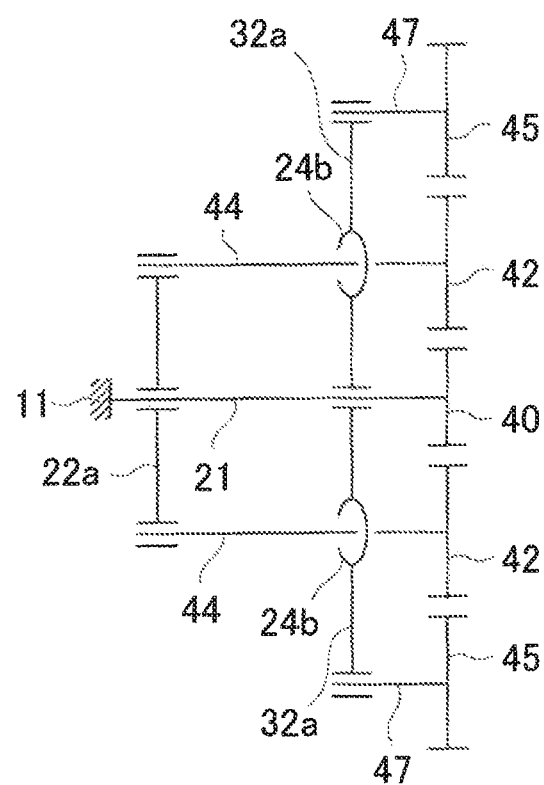
FIG. 11 is a development diagram showing the power transmission mechanism of FIG. 10.
Figure 12:
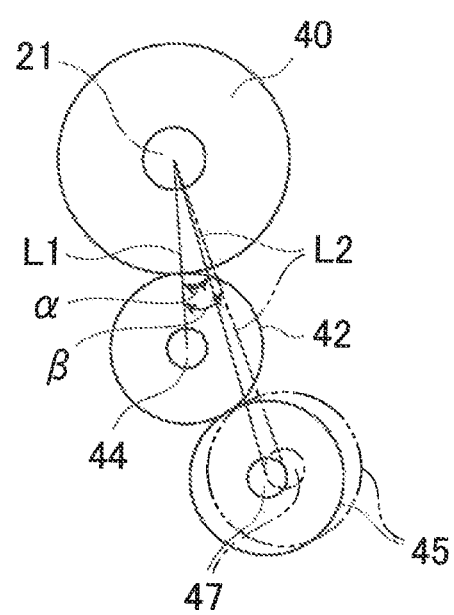
FIG. 12 is a schematic diagram showing a state in which a rotation prevention state is released in FIG. 10.

FIG. 6 is a side view showing the inner first carrier member of the power transmission mechanism of FIG. 2. FIG. 7 is a side view showing the outer first carrier member of the power transmission mechanism of FIG. 2. FIG. 8 is a side view showing the inner second carrier member of the power transmission mechanism of FIG. 2. FIG. 9 is a side view showing the outer second carrier member of the power transmission mechanism of FIG. 2. FIG. 10 is a conceptual diagram showing the power transmission mechanism according to the embodiment of the present invention. FIG. 11 is a development diagram showing the power transmission mechanism of FIG. 10. FIG. 12 is a schematic diagram showing a state in which a rotation prevention state is released in FIG. 10.

In the following description, holes corresponding to each other in the first carrier member 22 and the second carrier member 32 are denoted by the same name and the same reference numeral. In FIG. 11, illustration of the outer first carrier member 22b and the outer second carrier member 32b is omitted.

As shown in FIG. 6, the inner first carrier member 22a is formed in a disk shape and has a center hole 23 through which the center shaft 21 is inserted at the center thereof, three first shaft insertion holes 24a through which three first shafts 44 described later are inserted respectively, a cam hole 25a through which a cam member described later is loosely inserted, and guide holes 26 through which guide pins of a moving plate described later are inserted. The center hole 23, the first shaft insertion holes 24a, and the guide holes 26 are formed respectively in a circular shape. The cam hole 25a is formed in a rectangular shape in which both end portions are arc-shaped. The three first shaft insertion holes 24a are arranged at the same position in the radial direction and at regular intervals in the circumferential direction, that is, at intervals of an angle of 120 degrees.

As shown in FIG. 7, the outer first carrier member 22b has the same diameter as the inner first carrier member 22a, and, similarly to the inner first carrier member 22a, has a center hole 23 and three first shaft insertion holes 24a. The first shaft insertion holes 24a are also formed at the same positions and in the same number as those of the inner first carrier member 22a.

As shown in FIG. 8, the inner second carrier member 32a has a center hole 23 through which the center shaft 21 is inserted, three first shaft insertion holes 24b through which the three first shafts 44 described later are inserted respectively, a cam hole 25b through which a cam member described later is loosely inserted, guide holes 26 through which guide pins of the moving plate described later are inserted, and three second shaft insertion holes 27 through which three second shafts 47 described later are inserted respectively. The three second shaft insertion holes 27 are arranged at positions shifted in a predetermined range with respect to the circumferential direction on the outer peripheral side of the three first shaft insertion holes 24b, respectively. The center hole 23, the first shaft insertion holes 24b, the guide holes 26, and the second shaft insertion holes 27 are formed respectively in a circular shape. The cam hole 25b is formed in a rectangular shape in which both end portions are arc-shaped. The cam hole 25b is formed shorter than the cam hole 25a of the inner first carrier member 22a and is arranged at a position corresponding thereto.

As shown in FIG. 9, the outer second carrier member 32b has a center hole 23 through which the center shaft 21 is inserted, three first shaft insertion holes 24b through which the three first shafts 44 described later are inserted respectively, and three second shaft insertion holes 27 through which the three second shafts 47 described later are inserted respectively. The second shaft insertion holes 27 are also formed at the same positions and in the same number as those of the inner second carrier member 32a.

As shown in FIGS. 2, 3, 10, and 11, a reference gear member 40, three first planetary gear members 42, and three second planetary gear members 45 are arranged between the inner second carrier member 32a and the outer second carrier member 32b in this order from the center toward the outer circumferential direction. As shown in FIGS. 10 and 11, the reference gear member 40 is a spur gear having an outer circumferential gear portion 41 arranged on an outer circumferential surface thereof, and is fixed to the center shaft 21.

The first planetary gear member 42 is a spur gear having an outer circumferential gear portion 43 arranged on an outer circumferential portion thereof. The first planetary gear member 42 is rotatably supported by the first carrier member 22 via the first shaft 44. The outer circumferential gear portion 43 of the first planetary gear member 42 is meshed with the outer circumferential gear portion 41 of the reference gear member 40. The first planetary gear members 42 are arranged respectively via the corresponding first shaft 44 at three positions equally spaced from each other along the circumferential direction of the first carrier member 22.

As shown in FIGS. 2 and 3, each of the first shafts 44 is inserted through the first shaft insertion hole 24a of the first carrier member 22 and the first shaft insertion hole 24b of the second carrier member 32, respectively, with both ends thereof fixed to the corresponding outer surface of the first carrier member 22.

As shown in FIG. 10, the first shaft 44 is arranged as having a predetermined gap G1 with respect to the first planetary gear member 42. Therefore, the first planetary gear member 42 is configured to be movable by the amount of the gap G1. The first shaft 44 is inserted to the first shaft insertion hole 24a of the first carrier member 22 shown in FIG. 6 without a gap, and is loosely inserted to the first shaft insertion hole 24b of the second carrier member 32 as having a predetermined gap G2 therewith as shown in FIG. 8. Thus, the first carrier member 22 and the second carrier member 32 are rotatable relative to each other in a predetermined range.

The second planetary gear member 45 is a spur gear having an outer diameter substantially equal to that of the first planetary gear member 42 and having an outer circumferential gear portion 46 on an outer circumferential portion thereof. The second planetary gear member 45 is rotatably supported by the second carrier member 32 via the second shaft 47. The outer circumferential gear portion 46 of the second planetary gear member 45 is meshed with the outer circumferential gear portion 43 of the first planetary gear member 42. The second planetary gear members 45 are arranged respectively via the corresponding second shaft 47 at three positions equally spaced from each other along the circumferential direction of the second carrier member 32.

The second carrier member 32 is supported so as to be rotatable about the center shaft 21 with respect to the reference gear member 40 while maintaining a state in which the second planetary gear member 45 is meshed with the outer circumferential gear portion 43 of the first planetary gear member 42 via the outer circumferential gear portion 46 and maintaining a state in which the first planetary gear member 42 is meshed with the outer circumferential gear portion 41 of the reference gear member 40 via the outer circumferential gear portion 43.

In the present embodiment, as shown in FIG. 10, the reference gear member 40, the first planetary gear member 42, and the second planetary gear member 45 are arranged such that a line L1 connecting the center shaft 21 of the reference gear member 40 and the first shaft 44 of the first planetary gear member 42 and a line L2 connecting the center shaft 21 of the reference gear member 40 and the second shaft 47 of the second planetary gear member 45 form a specific angle α.

When the first carrier member 22 and the second carrier member 32 are relatively rotated in the direction of decreasing the specific angle α, the rotation in the backward movement direction is prevented. In this case, since the first planetary gear member 42 is arranged with the slight gap G1 with respect to the first shaft 44 and is movable by the amount of the gap G1, the first planetary gear member 42 is easily meshed between the reference gear member 40 and the second planetary gear member 45.

Specifically, when the first carrier member 22 and the second carrier member 32 are relatively rotated in the direction to decrease the specific angle α by rotating the second carrier member 32, the pitch point of the first planetary gear member 42 moves in the direction to enter the inside of the second planetary gear member 45 and the pitch point of the second planetary gear member 45 moves in the direction to enter the inside of the first planetary gear member 42, so that the backlash between the first planetary gear member 42 and the second planetary gear member 45 becomes zero and the first planetary gear member 42 and the second planetary gear member 45 are meshed and locked. Thus, the rotation of the first carrier member 22 and the second carrier member 32 with respect to the reference gear member 40 is prevented, and the wheel 13 cannot move backward.

On the other hand, as shown in FIG. 12, when the first carrier member 22 and the second carrier member 32 are relatively rotated in the direction to increase the specific angle α by rotating the second carrier member 32 in a direction opposite to the direction to change the specific angle from α to β (indicated by a two-dot chain line), the wheel 13 can move backward. That is, when the first carrier member 22 and the second carrier member 32 are relatively rotated in the direction to increase the specific angle α by rotating the second carrier member 32, the pitch point of the second planetary gear member 45 moves away from the first planetary gear member 42. Therefore, the first planetary gear member 42 and the second planetary gear member 45 are not locked, and the first planetary gear member 42 and the second planetary gear member 45 revolve around the reference gear member 40 while rotating respectively, so that the wheel 13 can move backward.

Thus, the relative rotation between the second carrier member 32 and the first carrier member 22 will change the meshing state between the second planetary gear member 45 and the first planetary gear member 42. That is, in the present embodiment, by adjusting the specific angle α, it is possible to control the meshing state between the second planetary gear member 45 and the first planetary gear member 42.

Further, since the first shaft 44 is loosely inserted to the first shaft insertion hole 24b of the second carrier member 32 with the predetermined gap G2, by rotating the first carrier member 22, the first carrier member 22 rotates relative to the second carrier member 32 by the amount of the gap G2 and then rotates integrally with the second carrier member 32, thereby allowing the wheel 13 to move forward or backward.

Next, description will be provided on the configuration of the rotation prevention release unit as a rotation prevention release means of the present embodiment with reference to FIGS. 2 to 3 and 12 to 15.

Figure 13:
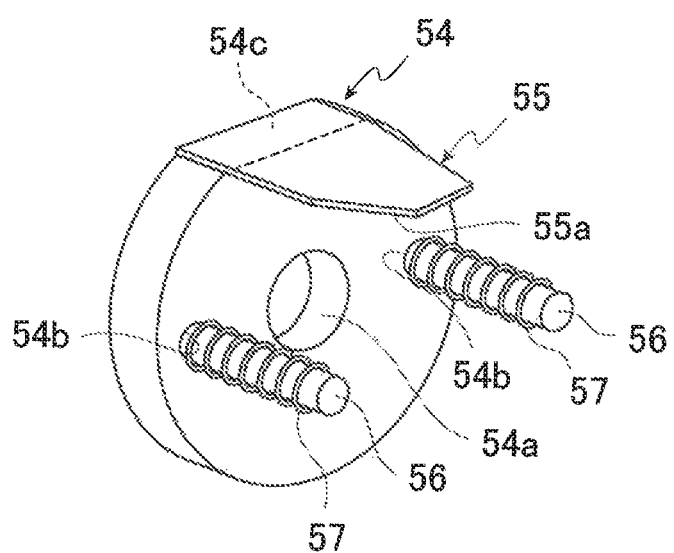
FIG. 13 is a perspective view showing a moving plate of the power transmission mechanism of FIG. 2.
Figure 14:
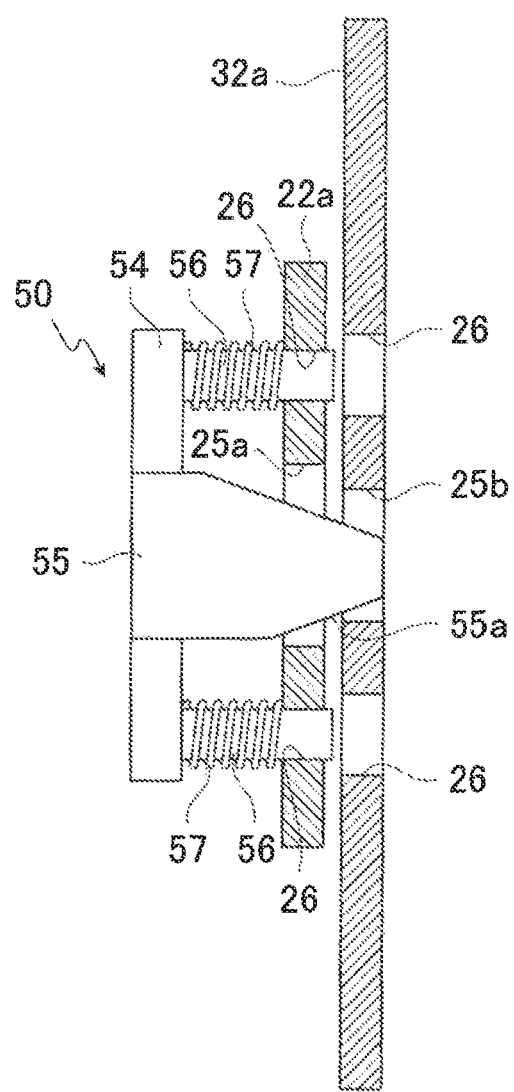
FIG. 14 is a sectional view showing an essential part of a rotation prevention release unit of the power transmission mechanism according to an embodiment of the present invention.
Figure 15:
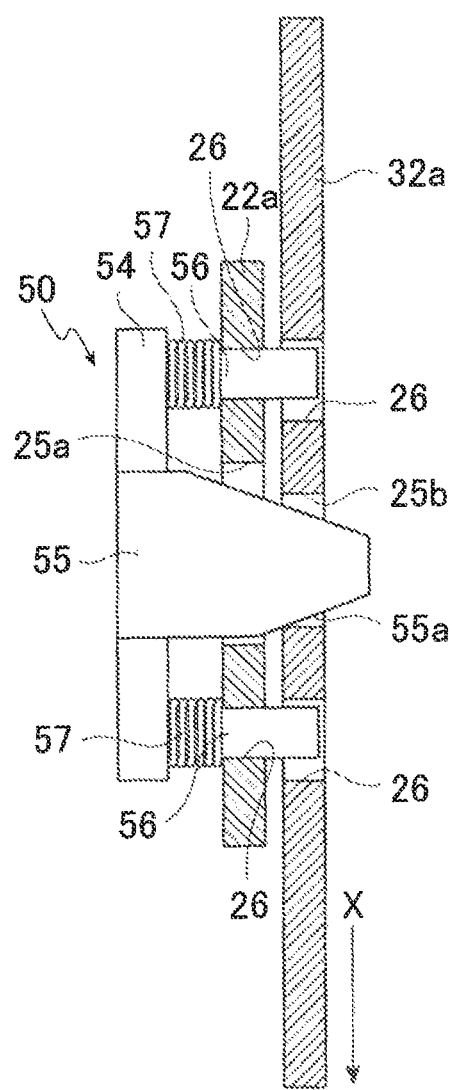
FIG. 15 is a sectional view showing an operating state of the rotation prevention release unit of FIG. 14.

FIG. 13 is a perspective view showing a moving plate of the power transmission mechanism of FIG. 2. FIG. 14 is a sectional view showing an essential part of a rotation prevention release unit of the power transmission mechanism according to the embodiment of the present invention. FIG. 15 is a sectional view showing an operating state of the rotation prevention release unit of FIG. 14.

In the present embodiment, as described above there is provided the rotation prevention release unit for releasing the rotation prevention state by relatively rotating the first carrier member 22 and the second carrier member 32 in the direction to increase the specific angle α formed between the line L1 connecting the center shaft 21 of the reference gear member 40 and the first shaft 44 of the first planetary gear member 42 and the line L2 connecting the center shaft 21 of the reference gear member 40 and the second shaft 47 of the second planetary gear member 45.

As shown in FIGS. 2 and 3, the rotation prevention release unit 50 as the rotation prevention release means includes a release lever 16, a connection wire 51, a crank member 52, an attachment member 53, a moving plate 54 as a moving member, and a cam member 55.

The release lever 16 is attached to the operation handle 15 for the caregiver to control the travel direction of the wheelchair 10 as described above. The release lever 16 is connected to the crank member 52 via the connection wire 51. The crank member 52 is attached to the attachment member 53 swingably clockwise and counterclockwise about a support shaft 52a.

The moving plate 54 is configured to be movable along the axial direction of the center shaft 21 of the reference gear member 40. The center shaft 21 of the reference gear member 40 is inserted to a center hole 54a of the moving plate 54.

As shown in FIG. 13, the center hole 54a and two pin holes 54b are formed in the moving plate 54. The two pin holes 54b of the moving plate 54 are arranged at positions opposed to each other in the circumferential direction, and guide pins 56 shown in FIGS. 14 and 15 are inserted to the pin holes 54*b*, respectively. The guide pins 56 are fitted respectively to the guide holes 26 of the inner first carrier member 22*a*. Thus, the moving plate 54 and the inner first carrier member 22*a* is integrally rotatable.

A coil spring 57 is wound around the outer periphery of each guide pin 56 to apply an elastic force to the moving plate 54 in the direction to be away from the first carrier member 22 and the second carrier member 32.

As shown in FIG. 13, a part of the moving plate 54 in the circumferential direction is cut out to form a flat surface 54*c*, and an end of one side of the cam member 55 shown in FIGS. 14 and 15 is fixed to the flat surface 54*c*. The other side of the cam member 55 has a tapered portion 55*a* formed in a tapered shape.

As shown in FIG. 14, the distal end of the tapered portion 55*a* is inserted to a cam hole 25*a* of the inner first carrier member 22*a* and a cam hole 25*b* of the inner second carrier member 32*a*. When the moving plate 54 is moved to be close to the first carrier member 22 and the second carrier member 32 against the elastic force of the coil spring 57, as shown in FIG. 15, the tapered surface of the tapered portion 55*a* comes in contact with the opening end of the cam hole 25*b* of the inner second carrier member 32*a* and pushes the inner second carrier member 32*a* in the direction of arrow X, thereby rotating the inner second carrier member 32*a* relative to the inner first carrier member 22*a*. Here, the tapered portion 55*a* is merely inserted to the opening end of the cam hole 25*a* of the inner first carrier member 22*a* without coming in contact therewith.

When the inner second carrier member 32*a* is relatively rotated with respect to the inner first carrier member 22*a*, as shown in FIG. 12, the specific angle α formed between the line L1 connecting the center shaft 21 of the reference gear member 40 and the first shaft 44 of the first planetary gear member 42 and the line L2 connecting the center shaft 21 of the reference gear member 40 and the second shaft 47 of the second planetary gear member 45 is increased to β, thereby allowing the wheel 13 to move backward. That is, when the second carrier member 32 is relatively rotated with respect to the first carrier member 22 in the direction to increase the specific angle α by rotating the second carrier member 32, the pitch point of the second planetary gear member 45 moves away from the first planetary gear member 42. Therefore, the first planetary gear member 42 and the second planetary gear member 45 are not locked, and the first planetary gear member 42 and the second planetary gear member 45 revolve around the reference gear member 40 while rotating respectively, so that the wheel 13 can move backward.

Next, the operation of the present embodiment will be described.

As described above, the first carrier member 22 is connected to the hand rim 18 of the wheelchair 10 and the second carrier member 32 is connected to the wheel 13. In the wheelchair 10 configured as described above, when the hand rim 18 is rotated, the first carrier member 22 of the power transmission mechanism 20 rotates, the second carrier member 32 rotates in the same direction as the rotation of the first carrier member 22, and the wheel 13 connected to the second carrier member 32 rotates.

The rotational operation of the hand rim 18 is transmitted to the first carrier member 22 in any direction of the forward direction and the backward direction of the wheelchair 10. That is, since the first shaft 44 is loosely inserted to the first shaft insertion hole 24*b* of the second carrier member 32 with the predetermined gap G2, when the hand rim 18 is rotationally operated to rotate the first carrier member 22 in the forward or reverse direction, the wheelchair 10 can be moved forward or backward with the wheel 13 rotated forward or backward integrally with the second carrier member 32 via the first shaft 44 after being relatively rotated with respecgt to the second carrier member 32 by the amount of the gap G2.

Further, in the wheelchair 10, for example, even when the user releases his/her hand from the hand rim 18 while climbing a slope, the wheelchair 10 does not fall down the slope on its own. Further, even if the user accidentally touches the step 17, the body frame 11, or the like with a part of his/her leg such as the calf when sitting onto the wheelchair 10, the wheelchair 10 does not move backward, and the user can surely sit on the wheelchair 10 as simply sitting onto the wheelchair 10 in a normal manner. When the wheel 13 is to be rotated in the forward direction, it is possible to travel without being restricted.

However, in the present embodiment, when the caregiver wants to move the wheelchair 10 backward, for example, when the caregiver moves the wheelchair 10 backward in both a state in which the hand rim 18 is not operated while the user is seated and a state in which the user is not seated, the operation of the caregiver is not restricted.

Specifically, when the caregiver moves the wheelchair 10 backward, the caregiver grasps the release lever 16. Thus, the connection wire 51 is pulled, and the crank member 52 swings clockwise in FIG. 2 about the support shaft 52*a*. Then, the moving plate 54 is moved in the direction to be close to the first carrier member 22 and the second carrier member 32 against the elastic force of the coil spring 57.

At this time, from the state shown in FIG. 14 in which the distal end of the tapered portion 55*a* of the cam member 55 is inserted through the cam hole 25*a* of the inner first carrier member 22*a* and the cam hole 25*b* of the inner second carrier member 32*a*, the tapered portion 55*a* contacts the opening end of the cam hole 25*b* and pushes it in the direction of arrow X as shown in FIG. 15 to rotate the second carrier member 32 relative to the first carrier member 22.

In this case, as shown in FIG. 12, the first carrier member 22 and the second carrier member 32 rotate relative to each other in a direction in which the specific angle α formed between the line L1 connecting the center shaft 21 of the reference gear member 40 and the first shaft 44 of the first planetary gear member 42 and the line L2 connecting the center shaft 21 of the reference gear member 40 and the second shaft 47 of the second planetary gear member 45 is increased, thereby the specific angle α is changed to β.

That is, since the pitch point of the first planetary gear member 42 moves away from the second planetary gear member 45, the backlash between the first planetary gear member 42 and the second planetary gear member 45 increases, the first planetary gear member 42 and the second planetary gear member 45 are not locked, and the first planetary gear member 42 and the second planetary gear member 45 revolve around the reference gear member 40 while rotating respectively, so that the wheel 13 can move backward.

As shown in FIG. 8, the guide hole 26 having a diameter larger than that of the guide pin 56 is opened in the inner second carrier member 32*a*. Therefore, even if the guide pin 56 becomes close to the inner second carrier member 32*a* together with the moving plate 54 as shown in FIG. 15, the distal end of the guide pin 56 is inserted to the guide hole 26 and does not interfere with the inner second carrier member 32*a*.

Then, when the caregiver releases the release lever 16 from the state of grasping the release lever 16, the moving plate 54 is moved in the direction to be away from the first carrier member 22 and the second carrier member 32 by the elastic force of the coil spring 57. At the same time, the tapered portion 55a of the cam member 55 slides so as to be away from the open end of the cam hole 25b, the moving plate 54 returns to the original position, and the crank member 52 swings counterclockwise in FIG. 2 and returns to the original position.

As described above, according to the present embodiment, the reference gear member 40, the first planetary gear member 42, and the second planetary gear member 45 are arranged such that the line L1 connecting the center shaft 21 of the reference gear member 40 and the first shaft 44 of the first planetary gear member 42 and the line L2 connecting the center shaft 21 of the reference gear member 40 and the second shaft 47 of the second planetary gear member 45 form the specific angle α. Further, when the first carrier member 22 and the second carrier member 32 are relatively rotated in the direction to decrease the specific angle α, it is configured to prevent rotation in one direction. Further, there is provided the rotation prevention release unit 50 which releases the rotation prevention state when the first carrier member 22 and the second carrier member 32 are relatively rotated in the direction to increase the specific angle α. Accordingly, the reverse brake is provided and the reverse brake can be released temporarily.

Further, according to the present embodiment, by moving the cam member 55 in the direction to be close to the first carrier member 22 and the second carrier member 32, the first carrier member 22 and the second carrier member 32 are relatively rotated in the direction to increase the specific angle α so as to release the rotation prevention state. Thus, since the reverse brake is mechanically released, reliability can be improved.

Further, according to the present embodiment, the first shaft 44 of the first planetary gear member 42 is inserted to the first shaft insertion hole 24a formed in the first carrier member 22 and is loosely inserted to the first shaft insertion hole 24b formed in the second carrier member 32, and the second carrier member 32 is configured to be relatively rotatable in a predetermined range with respect to the first carrier member 22. Accordingly, it is possible to operate the reverse brake without using other members.

Further, according to the present embodiment, since the gap is provided between the first planetary gear member 42 and the first shaft 44, the first planetary gear member 42 is easily meshed between the reference gear member 40 and the second planetary gear member 45, and the reverse brake can be easily operated.

Further, according to the present embodiment, the center shaft 21 is connected to the body frame 11 of the wheelchair 10, the first carrier member 22 is connected to the hand rim 18 of the wheelchair 10, and the second carrier member 32 is connected to the wheel 13 of the wheelchair 10. Accordingly, the operability of the wheelchair 10 can be greatly improved.

Further, according to the present embodiment, the rotation prevention release unit 50 includes the release lever 16, the release lever 16 is attached to the operation handle 15 for controlling the travel direction of the wheelchair 10, and the cam member 55 is moved by operating the release lever 16 to release the rotation prevention state. Accordingly, the release operation of the reverse brake becomes extremely easy, and the operability of the wheelchair 10 can be greatly improved.

Other Embodiments

While one embodiment of the present invention has been described, the embodiment has been presented by way of example and is not intended to limit the scope of the invention. The embodiment can be implemented in various other forms, and various omissions, substitutions, modifications, and combinations can be made without departing from the spirit of the invention. The embodiment and the modifications thereof are included in the scope and the spirit of the invention, and are also included in the invention described in the claims and the equivalents thereof.

For example, in the above embodiment, an example in which the power transmission mechanism 20 is applied to the wheelchair 10 has been described, but the invention is not limited thereto and may be applied to, for example, a chain block device, a rotation drive unit of an escalator, and the like.

Further, in the above embodiment, an example in which the first carrier member 22 and the second carrier member 32 are arranged at the inner side and outer side, respectively, has been described. However, the first carrier member 22 and the second carrier member 32 may be arranged at least at the inner side as long as the respective gears can be meshed and rotated.

Further, in the above embodiment, the second planetary gear member 45 has substantially the same outer diameter as the first planetary gear member 42, but the present invention is not limited thereto. Further, although three first planetary gear members 42 and three second planetary gear members 45 are arranged, the number of the first planetary gear members 42 and the number of the second planetary gear members 45 may be other than three.

In the above embodiment, an example in which the release lever 16 is attached to the operation handle 15 has been described. However, the attachment position of the release lever 16 is not limited to the operation handle 15 and may be a position where the user can operate the release lever 16 or a position where both the caregiver and the user can operate the release lever 16. Attaching to such a position may allow the user or both the caregiver and the user to release the reverse brake. With such a configuration, it is possible to greatly improve the operability.

Further, in the above embodiment, an example in which the release lever 16 is arranged on each of the pair of left and right operation handles 15 has been described. However, the present invention is not limited thereto, and the reverse brake of the power transmission mechanism 20 attached to each of the pair of left and right wheels 13 may be configured to be released by operating any one of the left and right release levers 16. By attaching such a release lever 16 to a position operable by the user, it becomes possible to be operated by a use having one hand disabled.

REFERENCE SIGNS LIST

10 Wheelchair
11 Body frame
12 Caster
13 Wheel
14 Seat
15 Operation handle
16 Release lever
17 Step
18 Hand rim
20 Power transmission mechanism
21 Center shaft 22 First carrier member
22a Inner first carrier member
22b Outer first carrier member
23 Center hole
24a First shaft insertion hole
24b First shaft insertion hole
25a Cam hole
25b Cam hole
26 Guide hole
27 Second shaft insertion hole
32 Second carrier member
32a Inner second carrier member
32b Outer second carrier member
40 Reference gear member
41 Outer circumferential gear portion
42 First planetary gear member
43 Outer circumferential gear portion
44 First shaft
45 Second planetary gear member
46 Outer circumferential gear portion
47 Second shaft
50 Rotation prevention release unit (Rotation prevention release means)
51 Connection wire
52 Crank member
52a Support shaft
53 Attachment member
54 Moving plate (Moving member)
54a Center hole
54b Pin hole
54c Flat surface
55 Cam member
55a Tapered portion
56 Guide pin
57 Coil spring
α Specific angle

The invention claimed is:

1. A power transmission mechanism, comprising:
a reference gear member arranged on a center shaft;
a first carrier member arranged rotatably about the center shaft of the reference gear member;
a second carrier member arranged rotatably about the center shaft of the reference gear member;
a first planetary gear member rotatably arranged to the first carrier member via a first shaft and meshed with the reference gear member; and
a second planetary gear member rotatably arranged to the second carrier member via a second shaft and meshed with the first planetary gear member;
wherein the second carrier member is configured to be relatively rotatable with respect to the first carrier member in a predetermined range,
the first carrier member and the second carrier member are arranged concentrically about the reference gear member,
the reference gear member, the first planetary gear member, and the second planetary gear member are arranged such that a line connecting the center shaft of the reference gear member and the first shaft of the first planetary gear member and a line connecting the center shaft of the reference gear member and the second shaft of the second planetary gear member form a specific angle,
rotation in one direction is prevented when the first carrier member and the second carrier member are relatively rotated in a direction to decrease the specific angle, and
a rotation prevention release means is provided to release a prevention state of the rotation when the first carrier member and the second carrier member are relatively rotated in a direction to increase the specific angle.

2. The power transmission mechanism according to claim 1,
wherein the rotation prevention release means includes a moving member movable along an axial direction of the center shaft of the reference gear member, and a cam member fixed to the moving member, and is configured to release the prevention state of the rotation by moving the cam member in a direction to be close to the first carrier member and the second carrier member so that the first carrier member and the second carrier member are relatively rotated in the direction to increase the specific angle.

3. The power transmission mechanism according to claim 2, wherein
the first shaft of the first planetary gear member is inserted to a first shaft insertion hole formed in the first carrier member and is loosely inserted to a first shaft insertion hole formed in the second carrier member, and
the second carrier member is configured to be relatively rotatable in a predetermined range with respect to the first carrier member.

4. The power transmission mechanism according to claim 2,
wherein a gap is provided between the first planetary gear member and the first shaft.

5. The power transmission mechanism according to claim 2,
wherein the center shaft is connected to a body frame of a wheelchair, the first carrier member is connected to a hand rim of the wheelchair, and the second carrier member is connected to a wheel of the wheelchair.

6. The power transmission mechanism according to claim 1,
wherein the first shaft of the first planetary gear member is inserted to a first shaft insertion hole formed in the first carrier member and is loosely inserted to a first shaft insertion hole formed in the second carrier member, and
the second carrier member is configured to be relatively rotatable in a predetermined range with respect to the first carrier member.

7. The power transmission mechanism according to claim 6,
wherein a gap is provided between the first planetary gear member and the first shaft.

8. The power transmission mechanism according to claim 6,
wherein the center shaft is connected to a body frame of a wheelchair, the first carrier member is connected to a hand rim of the wheelchair, and the second carrier member is connected to a wheel of the wheelchair.

9. The power transmission mechanism according to claim 1,
wherein a gap is provided between the first planetary gear member and the first shaft.

10. The power transmission mechanism according to claim 9,
wherein the center shaft is connected to a body frame of a wheelchair, the first carrier member is connected to a hand rim of the wheelchair, and the second carrier member is connected to a wheel of the wheelchair.

11. The power transmission mechanism according to claim 1, wherein the center shaft is connected to a body frame of a wheelchair, the first carrier member is connected to a hand rim of the wheelchair, and the second carrier member is connected to a wheel of the wheelchair.

12. The power transmission mechanism according to claim 11, wherein the rotation prevention release means includes a moving member movable along an axial direction of the center shaft of the reference gear member, and a cam member fixed to the moving member, and is configured to release the prevention state of the rotation by moving the cam member in a direction to be close to the first carrier member and the second carrier member so that the first carrier member and the second carrier member are relatively rotated in the direction to increase the specific angle, and wherein the rotation prevention release means includes a release lever, the release lever is attached to an operation handle for controlling a travel direction of the wheelchair, and the cam member is moved by operating the release lever to release the prevention state of the rotation.

\* \* \* \* \*